(12) United States Patent
Tsukizaki

(10) Patent No.: US 12,036,974 B2
(45) Date of Patent: Jul. 16, 2024

(54) HYBRID VEHICLE

(71) Applicant: Nissan Motor Co., Ltd., Yokohama (JP)

(72) Inventor: Atsushi Tsukizaki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 804 days.

(21) Appl. No.: 17/273,746

(22) PCT Filed: Oct. 5, 2018

(86) PCT No.: PCT/JP2018/037400
§ 371 (c)(1),
(2) Date: Mar. 5, 2021

(87) PCT Pub. No.: WO2020/070881
PCT Pub. Date: Apr. 9, 2020

(65) Prior Publication Data
US 2021/0323534 A1 Oct. 21, 2021

(51) Int. Cl.
| *B60K 6/36* | (2007.10) |
| *B60K 6/24* | (2007.10) |
| *B60K 6/26* | (2007.10) |
| *B60W 20/20* | (2016.01) |

(52) U.S. Cl.
CPC .............. *B60W 20/20* (2013.01); *B60K 6/24* (2013.01); *B60K 6/26* (2013.01); *B60K 6/36* (2013.01); *B60Y 2200/92* (2013.01)

(58) Field of Classification Search
CPC .......... B60W 20/20; B60K 6/24; B60K 6/26; B60K 6/36; B60Y 2200/92
See application file for complete search history.

(56) References Cited

U.S. PATENT DOCUMENTS

| 8,074,753 | B2 * | 12/2011 | Tahara | H02K 9/19 180/65.21 |
| 8,181,548 | B2 * | 5/2012 | Michishita | B60K 6/52 74/421 A |
| 8,602,935 | B2 * | 12/2013 | Katoh | B60K 1/00 184/6.12 |

(Continued)

FOREIGN PATENT DOCUMENTS

| CN | 105584349 B | 2/2018 |
| EP | 3 453 549 A1 | 3/2019 |

(Continued)

*Primary Examiner* — Bryan A Evans
(74) *Attorney, Agent, or Firm* — Global IP Counselors, LLP

(57) ABSTRACT

A hybrid vehicle includes an internal combustion engine, an electric-power generator, an electric motor and a transmission device. The transmission device includes an input gear, an output gear, an intermediate gear, a case and a connection-disconnection device. The connection-disconnection device is configured to switch between connecting and disconnecting a path along which the drive force is inputted to the input gear. The intermediate gear has a rotational center that is positioned lower in a vertical direction than a straight line that links a rotational center of the input gear and a rotational center of the output gear as seen from an axial direction, which is a direction parallel to the rotational axis of the intermediate gear.

6 Claims, 2 Drawing Sheets

(56) References Cited

U.S. PATENT DOCUMENTS

| | | | | |
|---|---|---|---|---|
| 9,821,648 B2* | 11/2017 | Ooki | ............... | F16H 57/0495 |
| 10,807,457 B2* | 10/2020 | Ogino | ............... | B60L 50/16 |
| 10,814,713 B2* | 10/2020 | Ogino | ............... | B60K 6/387 |

FOREIGN PATENT DOCUMENTS

| | | |
|---|---|---|
| JP | 2010-38326 A | 2/2010 |
| JP | 2015-9648 A | 1/2015 |
| JP | 2015-54612 A | 3/2015 |
| JP | 6202256 B2 | 9/2017 |

\* cited by examiner

HYBRID VEHICLE

CROSS-REFERENCE TO RELATED APPLICATIONS

This application is a U.S. national stage application of International Application No. PCT/JP2018/037400, filed on Oct. 5, 2018.

BACKGROUND

Technical Field

The present invention relates to a hybrid vehicle.

Background Information

Japanese Patent No. 6,202,256 (Patent Document 1) discloses a hybrid vehicle that can travel by switching between a series scheme and a parallel scheme. In the hybrid vehicle, a transmission device for realizing the parallel scheme is installed between an internal combustion engine and drive wheels. The transmission device has an input gear that connects to the internal combustion engine, an output gear that connects to the drive wheel, an intermediate gear that connects the input gear and the output gear, and a clutch that connects and disconnects a drive force transmission path between the internal combustion engine and the input gear.

SUMMARY

In order for drive force from a high-volume internal combustion engine to be inputted, the input gear is established at a higher position relative to the other gears inside a case accommodating the transmission device. Therefore, the input gear is at a position higher than an oil level of the lubricating oil, and supplying the lubricating oil is a problem to be addressed. In this prior art hybrid vehicle, because the intermediate gear that meshes with the input gear is at a position higher than the input gear, thrusting the lubricating oil upward to lubricate the input gear has presented difficulties. It is an object of the present invention to provide a hybrid vehicle in which lubricity of an input gear can be improved.

According to the hybrid vehicle of the present invention, in a transmission device that transmits drive force generated by an internal combustion engine to drive wheels, a rotational center of an intermediate gear is positioned lower in a vertical direction than a straight line that links a rotational center of an input gear and a rotational center of an output gear as seen from an axial direction, which is a direction following a rotational axis of the intermediate gear.

This makes it possible for lubricating oil that has been thrust upward by the intermediate gear to be supplied to the input gear, therefore making it possible to improve lubricity of the input gear.

BRIEF DESCRIPTION OF THE DRAWINGS

Referring now to the attached drawings which form a part of this original disclosure.

DETAILED DESCRIPTION OF EMBODIMENTS

Figure 1:
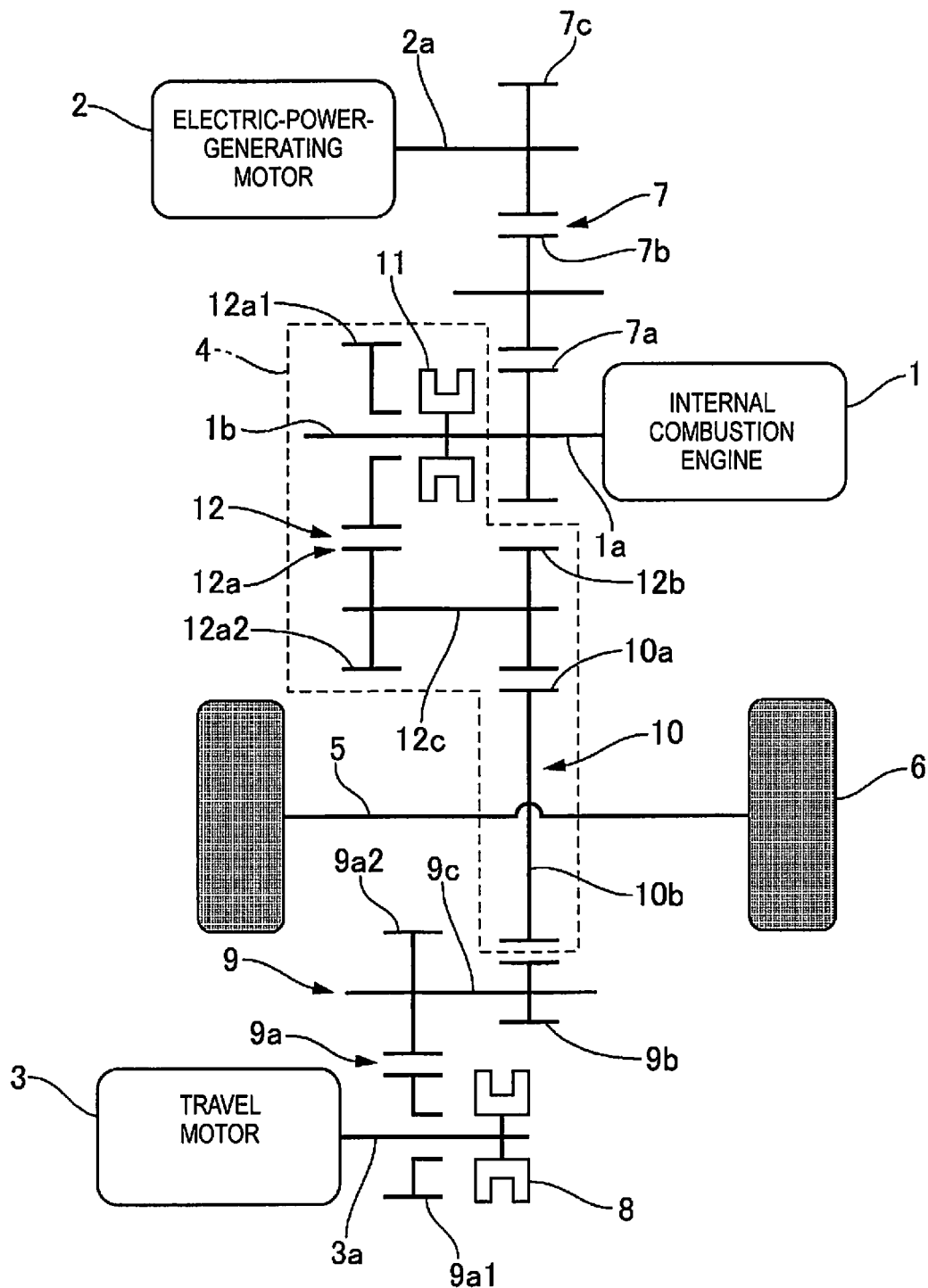
FIG. 1 is a schematic diagram showing a drive system of a hybrid vehicle in accordance with a first embodiment.

An embodiment for implementing the hybrid vehicle according to the present disclosure will be described below based on a first embodiment illustrated in the drawings.

First Embodiment

FIG. 1 is a schematic diagram showing a drive system of a hybrid vehicle in a first embodiment. The hybrid vehicle in the first embodiment has an internal combustion engine (engine) 1, an electric-power-generating motor (electric-power generator) 2, a travel motor (electric motor) 3, a transmission device 4, driveshafts 5, and drive wheels 6. A crankshaft 1a of the internal combustion engine 1 is coupled with an input shaft 1b. The input shaft 1b is coupled with a motor shaft 2a of the electric-power-generating motor 2 via an electric-power-generating-motor gear train 7. The electric-power-generating-motor gear train 7 has three gears 7a, 7b, 7c. The first gear 7a rotates integrally with the input shaft 1b. The third gear 7c rotates integrally with the motor shaft 2a. The second gear 7b meshes with each of the first gear 7a and the third gear 7c.

A motor shaft 3a of the travel motor 3 is coupled with a travel-motor reduction mechanism 9 via a motor travel clutch 8. The travel-motor reduction mechanism 9 has a travel-motor gear train 9a and a travel-motor final reduction gear 9b. The travel-motor gear train 9a has two gears 9a1, 9a2 that mesh with each other. The first gear 9a1 is coupled with one engagement element in the motor travel clutch 8. Another engagement element is coupled with the motor shaft 3a. The second gear 9a2 is joined to the travel-motor final reduction gear 9b by a rotating shaft 9c. The travel-motor final reduction gear 9b meshes with a ring gear (output gear) 10a of a differential 10 in the transmission device 4. Releasing the motor travel clutch 8 permits relative rotation between the motor shaft 3a and the first gear 9a1, and engaging the motor travel clutch 8 restricts relative rotation between the motor shaft 3a and the first gear 9a1.

In addition to the differential 10, the transmission device 4 has an internal-combustion-engine travel clutch (connection-disconnection device) 11 and an internal-combustion-engine travel gear set 12. Releasing the internal-combustion-engine travel clutch 11 permits relative rotation between the input shaft 1b and (a first gear 12a1 of) the internal-combustion-engine travel gear set 12, and engaging the internal-combustion-engine travel clutch 11 restricts relative rotation between the input shaft 1b and the internal-combustion-engine travel gear set 12. The internal-combustion-engine travel gear set 12 has an internal-combustion-engine travel gear train 12a and an internal-combustion-engine final reduction gear 12b. The internal-combustion-engine travel gear train 12a has two gears 12a1, 12a2 that mesh with each other. The first gear (input gear) 12a1 is coupled with one engagement element in the internal-combustion-engine travel clutch 11. Another engagement element is coupled with the input shaft 1b. The second gear 12a2 is joined to the internal-combustion-engine final reduction gear 12b by a rotating shaft 12c. The internal-combustion-engine final reduction gear 12b meshes with the ring gear 10a. In addition to the ring gear 10a, the differential 10 has a differential case 10b having an actuating mechanism unit (not shown) in an interior thereof. Left/right side gears of the actuating mechanism unit are joined to left/right driveshafts 5. The left/right driveshafts 5 are joined to the drive wheels 6.

In the hybrid vehicle in the first embodiment, engaging the motor travel clutch 8 and releasing the internal-combustion-engine travel clutch 11 effects travel under a series hybrid mode in which only the travel motor 3 is used as a motive power source for travel and the internal combustion engine 1 is used as a motive power source for electric-power generation. In addition, releasing the motor travel clutch 8 and engaging the internal-combustion-engine travel clutch 11 effects travel under an internal-combustion-engine direct coupling mode in which only the internal combustion engine 1 is used as a motive power source for travel. Engaging both of the two clutches 8, 11 enables travel in a parallel hybrid mode.

Figure 2:
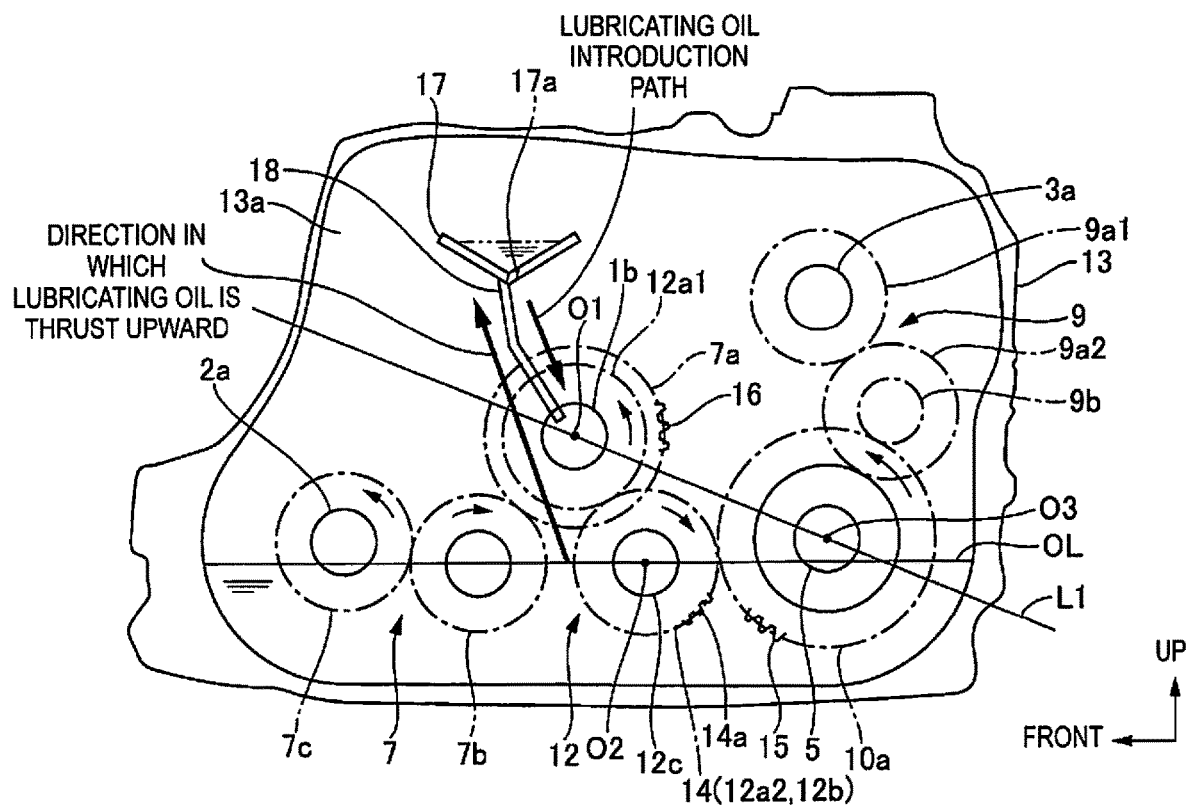
FIG. 2 is a schematic diagram in which a case 13 in the first embodiment is viewed from an axial direction of a driveshaft 5.

FIG. 2 a schematic diagram in which a case 13 in the first embodiment is viewed from an axial direction of a driveshaft 5. FIG. 2 illustrates meshing pitch circles for gears. Upward in the plane of the drawing shown in FIG. 2 is the same as upward in a vertical direction, and leftward in the plane of the drawing shown in FIG. 2 is the same as forward in a longitudinal direction of the vehicle. In addition to the constituent elements of the transmission device 4 (i.e., the differential 10, the internal-combustion-engine travel clutch 11, and the internal-combustion-engine travel gear set 12), the electric-power-generating-motor gear train 7 and the travel-motor reduction mechanism 9 are accommodated in the case 13. The ring gear 10a of the differential 10, the second gear 12a2 and the internal-combustion-engine final reduction gear 12b of the internal-combustion-engine travel gear set 12, and the second gear 7b and the third gear 7c of the electric-power-generating-motor gear train 7 are disposed in a lowermost section of the case 13. Lowermost ends of the gears 10a, 12a2, 12b, 7b, 7c are positioned lower than an oil level OL of oil (referred to as "lubricating oil" below) that is retained in the lowermost section of the case 13. The oil level OL is set at a height at which substantially lower halves of the gears 10a, 12a2, 12b, 7b, 7c are continuously submerged.

The gears 9a1, 9a2, 9b of the travel-motor reduction mechanism 9 are disposed at positions higher than the ring gear 10a. The first gear 9a1 is disposed at a position higher than the second gear 9a2 and the travel-motor final reduction gear 9b. The first gear 12a1 of the internal-combustion-engine travel gear set 12 and the first gear 7a of the electric-power-generating-motor gear train 7 are disposed at positions higher than the second gear 7b of the electric-power-generating-motor gear train 7 and the second gear 12a2 and internal-combustion-engine final reduction gear 12b of the internal-combustion-engine travel gear set 12. Lowermost ends of the gears 12a1, 7a are positioned higher than the oil level OL and are not submerged in the lubricating oil. A rotational center O2 of the second gear 12a2 and the internal-combustion-engine final reduction gear 12b is positioned lower than a straight line L1 that links a rotational center O1 of the first gear 12a1 and a rotational center O3 of the ring gear 10a as seen from a rotation-axis direction of the driveshaft 5.

In FIG. 2, arrows drawn inside the pitch circles for the gears indicate directions of rotation when the vehicle advances. Because the second gear 12a2 and the internal-combustion-engine final reduction gear 12b are coupled by the rotating shaft 12c and have the same number of teeth, these gears are regarded as one intermediate gear 14. The intermediate gear 14 rotates in a clockwise direction in FIG. 2. Specifically, the intermediate gear 14 rotates in a direction in which teeth 14a of the intermediate gear 14 that have passed through the lubricating oil stored inside the case 13 mesh with teeth 16 of the first gear 12a1 before teeth 15 of the ring gear 10a.

An oil reservoir 17 is established in a left-side wall 13a of the case 13. The oil reservoir 17 projects toward an interior of the case 13 from the left-side wall 13a, and has a recessed shape in which an upper portion is open. The oil reservoir 17 is capable of retaining lubricating oil that has been thrust upward by the intermediate gear 14. The oil reservoir 17 has an opening 17a in a lowermost end thereof. In the left-side wall 13a, an oil passage 18 is established below the oil reservoir 17. The oil passage 18 is a ridge that projects toward the interior of the case 13 from the left-side wall 13a. Lubricating oil that has dropped from the opening 17a is guided to a distal-end part of the input shaft 1b along the oil passage 18.

Figure 3:
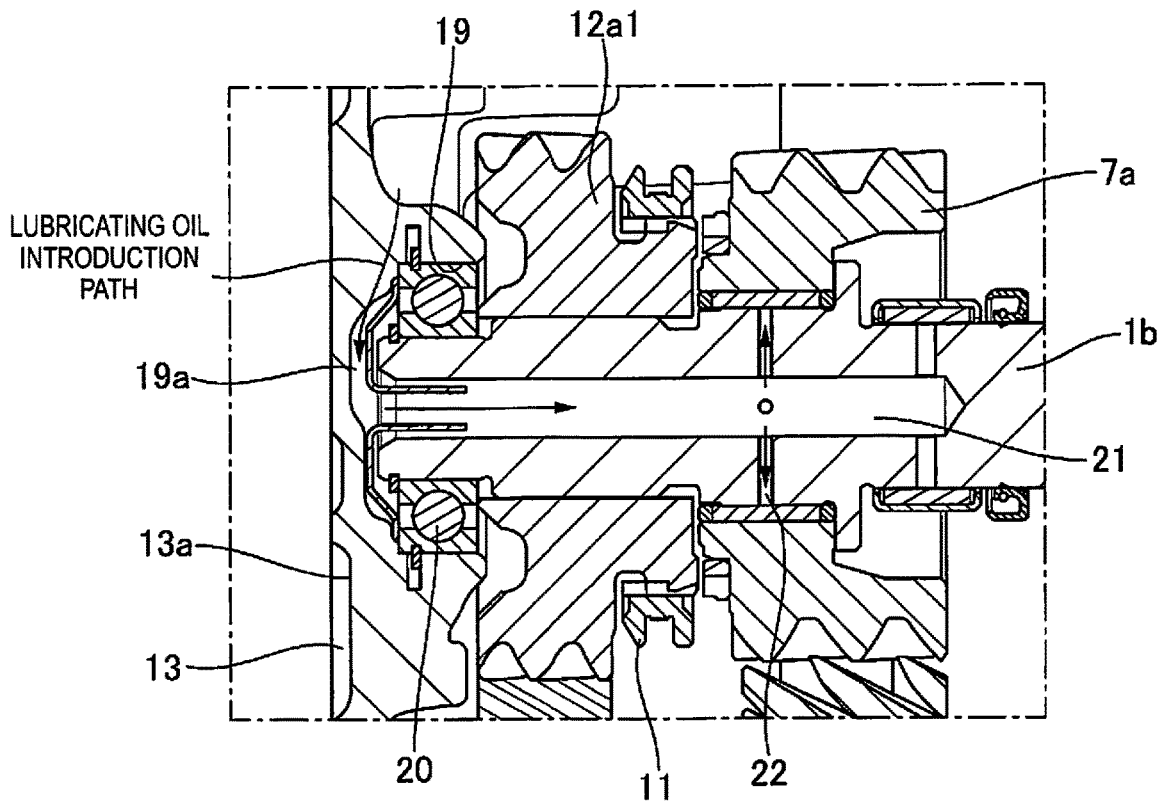
FIG. 3 is a transverse cross-sectional view of an input shaft 1b.

FIG. 3 is a transverse cross-sectional view of the input shaft 1b. A bearing 19 is established in the left-side wall 13a of the case 13. Ball bearings 20 are mounted in the bearing 19. The ball bearings 20 rotatably support the distal-end part of the input shaft 1b. A recess 19a that opens upward in the bearing 19 is established at a position facing a distal-end surface of the input shaft 1b. The lubricating oil flowing along the oil passage 18 is introduced into the recess 19a. The input shaft 1b has, in an interior thereof, a shaft core lubricating oil passage 21 and a plurality of diameter-direction oil passages 22. The shaft core lubricating oil passage 21 extends, in a direction following a rotational axis of the input shaft 1b, from the distal end of the input shaft 1b. The shaft core lubricating oil passage 21 communicates with the recess 19a. The diameter-direction oil passages 22 extend in a radial direction relative to a rotational center of the input shaft 1b, and allow the shaft core lubricating oil passage 21 and an outer peripheral surface of the input shaft 1b to communicate. Lubricating oil that has dropped into the recess 19a through the oil passage 18 is supplied to the shaft core lubricating oil passage 21 and is used to lubricate the first gear 7a and the first gear 12a1 upon passing through the diameter-direction oil passages 22 due to centrifugal force.

Effects of the first embodiment are described next. The hybrid vehicle in the first embodiment has the internal-combustion-engine travel clutch 11 that can connect and disconnect a path along which drive force is inputted from the input shaft 1b to the first gear 12a1. In series hybrid mode, releasing the internal-combustion-engine travel clutch 11 makes it possible to reduce the number of gears meshing under zero-load conditions at a site (internal-combustion-engine travel gear set 12) where a deviation has been made from the path (electric-power-generating-motor gear train 7) over which drive force is transferred to the electric-power-generating motor 2. Specifically, because rotation of the drive wheels 6 is transferred to the internal-combustion-engine travel gear set 12, zero-load conditions are not in effect. As a result, incidence of gear rattle associated with torque fluctuation of the internal combustion engine 1 can be suppressed.

However, a volume of the internal combustion engine 1 is high, and a vertical-direction position of the crankshaft 1a will tend to be relatively higher than the driveshafts 5, etc. Therefore, even the first gear 12a1 of the internal-combustion-engine travel gear set 12 to which drive force is inputted from the internal combustion engine 1 is established inside the case 13 of the transmission device 4 at a position that is relatively higher than the ring gear 10a, etc. In series hybrid mode, the first gear 12a1 continues to rotate in an un-assisted manner (co-rotates in association with the drive wheels 6), but because the first gear 12a1 is at a relatively high position and is set apart from the oil level OL of the lubricating oil stored inside the case 13, supplying the lubricating oil is a problem to be addressed.

However, in the hybrid vehicle in the first embodiment, the rotational center O2 of the intermediate gear 14 (second gear 12a2 and internal-combustion-engine final reduction gear 12b) is positioned lower than a straight line L1 that links the rotational center O1 of the first gear 12a1 and the rotational center O3 of the ring gear 10a as seen from the rotation-axis direction of the driveshaft 5. This results in some of the lubricating oil that has been thrust upward above the oil level OL by the intermediate gear 14 being flung toward the first gear 12a1 and makes it possible to for the lubricating oil to be supplied to the first gear 12a1, therefore making it possible to improve lubricity of the first gear 12a1.

A lowermost end of the intermediate gear 14 is positioned lower in the vertical direction than the lowermost end of the first gear 12a1. This results an increase in an area of the intermediate gear 14 coming into contact with the lubricating oil stored inside the case 13, and therefore, increases the amount of lubricating oil that is thrust upward and it is made possible to further improve lubricity of the first gear 12a1.

The first gear 12a1 is lubricated only by lubricating oil that has been thrust upward by the intermediate gear 14. Specifically, a pump for pumping the lubricating oil to the first gear 12a1 is unnecessary, therefore avoiding incidence of motive power loss associated with actuation of such a pump.

The intermediate gear 14 rotates in a direction in which the teeth 14a of the intermediate gear 14 that have passed through the lubricating oil stored inside the case 13 mesh with the teeth 16 of the first gear 12a1 before the teeth 15 of the ring gear 10a. Due to the intermediate gear 14 being configured to mesh with the first gear 12a1 before the ring gear 10a, the lubricating oil that has been thrust upward above the oil level OL by the intermediate gear 14 is flung toward the first gear 12a1 and makes it possible for more of the lubricating oil to be supplied to the first gear 12a1, therefore making it possible to further improve lubricity of the first gear 12a1.

The oil reservoir 17, the oil passage 18, the recess 19a, the shaft core lubricating oil passage 21, and the plurality of diameter-direction oil passages 22 are provided as an oil passage for supplying the lubricating oil that has been thrust upward by the intermediate gear 14 to the first gear 12a1. This makes it possible for some of the lubricating oil that has been thrust upward by the intermediate gear 14 and has not adhered to the first gear 12a1 to be used in lubricating the first gear 12a1. As a result, usage efficiency of the lubricating oil that has been thrust upward by the intermediate gear 14 is raised. In addition, lubricity of the first gear 12a1 can be further improved.

The lowermost end of the first gear 12a1 is positioned higher in the vertical direction that the oil level OL of the lubricating oil stored inside the case 13. This makes it possible to prevent worsening of motive power transmission efficiency associated with agitation of the lubricating oil by the first gear 12a1. In addition, generation of heat associated with agitation of the lubricating oil can be minimized, and excessive increases in temperature can be suppressed.

OTHER EMBODIMENTS

A mode for carrying out the present invention has been described above on the basis of the embodiment, but the specific configuration of the present invention is not limited to this embodiment; design changes, etc., that do not depart from the scope of the invention are also included in the present invention. For example, the oil level OL of the lubricating oil stored inside the case 13 may be at a height at which at least part of the intermediate gear 14 is submerged.

The invention claimed is:

1. A hybrid vehicle comprising:
an internal combustion engine;
an electric-power generator that receives a drive force generated by the internal combustion engine and generates electric power;
an electric motor that receives a supply of electric power generated by the electric-power generator and drives a drive wheel;
a first transmission device that transmits the drive force generated by the internal combustion engine to the drive wheel, the first transmission device having a first input gear, a first output gear, a first intermediate gear and a connection-disconnection device;
a second transmission device that transmits the driving force generated by the internal combustion engine to the electric-power generator, the second transmission device having a second input gear, a second output gear and a second intermediate gear; and
a case accommodating the first input gear, the first intermediate gear, the first output gear, the second input gear, the second output gear and the second intermediate gear,
the first input gear being configured to receive the drive force as an input from the internal combustion engine,
the first output gear being configured to output the drive force to the drive wheel,
the first intermediate gear being configured to transmit the drive force between the first input gear and the first output gear,
the connection-disconnection device being configured to switch between connecting and disconnecting a path along which the drive force is inputted to the first input gear,
a rotational center of the first intermediate gear being positioned lower in a vertical direction than a straight line that links a rotational center of the first input gear and a rotational center of the first output gear as seen from an axial direction, where the axial direction is a direction along a rotational axis of the first intermediate gear,
the second input gear being coaxially arranged with the first input gear, and configured to receive the drive force as an input from the internal combustion engine,
the second output gear being configured to output the drive force to the electric-power generator
the second intermediate gear being configured to transmit the drive force between the second input gear and the second output gear, and
a lowermost end of the second intermediate gear being positioned lower in the vertical direction than an oil level of a lubricating oil stored inside the case.

2. The hybrid vehicle according to claim 1, wherein a lowermost end of the first intermediate gear is positioned lower in the vertical direction than a lowermost end of the first input gear.

3. The hybrid vehicle according to claim 1, wherein the first input gear is lubricated only by the lubricating oil that has been thrust upward by the first intermediate gear.

4. The hybrid vehicle according to claim 1, wherein
the first intermediate gear is configured to rotate in a direction in which teeth of the first intermediate gear that have passed through the lubricating oil stored inside the case mesh with teeth of the first input gear before meshing with teeth of the first output gear.

5. The hybrid vehicle according to claim 1, further comprising
an oil passage for supplying the lubricating oil that has been thrust upward by the first intermediate gear to the first input gear.

6. The hybrid vehicle according to claim 1, wherein
a lowermost end of the first input gear is positioned higher in the vertical direction than the oil level of the lubricating oil stored inside the case.

* * * * *